US010352475B2

(12) United States Patent
Uehara et al.

(10) Patent No.: US 10,352,475 B2
(45) Date of Patent: Jul. 16, 2019

(54) ELECTRICALLY OPERATED VALVE

(71) Applicant: FUJIKOKI CORPORATION, Tokyo (JP)

(72) Inventors: Satoshi Uehara, Tokyo (JP); Bunta Narukawa, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 0 days.

(21) Appl. No.: 15/945,785

(22) Filed: Apr. 5, 2018

(65) Prior Publication Data

US 2018/0299029 A1 Oct. 18, 2018

(30) Foreign Application Priority Data

Apr. 12, 2017 (JP) .................. 2017-079164

(51) Int. Cl.
| | |
|---|---|
| *F16K 31/06* | (2006.01) |
| *F16K 37/00* | (2006.01) |
| *F16K 31/04* | (2006.01) |
| *F25B 41/06* | (2006.01) |
| *H02K 5/128* | (2006.01) |
| *H02K 7/00* | (2006.01) |
| *H02K 7/06* | (2006.01) |

(Continued)

(52) U.S. Cl.
CPC .......... *F16K 37/0033* (2013.01); *F16K 31/04* (2013.01); *F16K 31/0675* (2013.01); *F16K 37/0025* (2013.01); *F16K 37/0041* (2013.01); *F16K 37/0083* (2013.01); *F25B 41/062* (2013.01); *H02K 5/128* (2013.01); *H02K 7/003* (2013.01); *H02K 7/06* (2013.01); *H02K 11/215* (2016.01); *F25B 2341/0653* (2013.01); *H02K 37/00* (2013.01); *Y02B 30/72* (2013.01); *Y10T 137/8158* (2015.04); *Y10T 137/8225* (2015.04); *Y10T 137/8242* (2015.04)

(58) Field of Classification Search
CPC ............. F16K 37/0025; F16K 37/0033; F16K 37/0041; F16K 37/0083; Y10T 137/8158; Y10T 137/8225; Y10T 137/8242; H02K 5/128; H02K 7/003; H02K 11/215
USPC ........................................ 251/129.11, 129.12
See application file for complete search history.

(56) References Cited

U.S. PATENT DOCUMENTS 5,769,390 A * 6/1998 Ando .................... F16K 31/046
251/129.05
6,460,567 B1* 10/2002 Hansen, III ............. F16K 31/04
137/554

(Continued)

*Primary Examiner* — Matthew W Jellett
(74) *Attorney, Agent, or Firm* — Bacon & Thomas, PLLC

(57) ABSTRACT

The invention provides an electrically operated valve which can more accurately detect a position of a valve body. An electrically operated valve is provided with a valve shaft, a valve body, a rotor member which is movable together with the valve shaft in a parallel direction to a first direction, a stator member which applies a turning force to the rotor member, a permanent magnet member which turns together with the rotor member, an angle sensor which detects an angle of rotation of the permanent magnet, and a guide member which guides a relative movement of the rotor member or the valve shaft in relation to the permanent magnet member. A distance between the permanent magnet and the angle sensor is fixed when the permanent magnet member turns.

8 Claims, 8 Drawing Sheets

(51) Int. Cl.
*H02K 11/215* (2016.01)
*H02K 37/00* (2006.01)

(56) References Cited

U.S. PATENT DOCUMENTS

| | | | | |
|---|---|---|---|---|
| 6,561,480 | B1* | 5/2003 | Komiya | F16K 1/38 |
| | | | | 251/122 |
| 7,325,780 | B2* | 2/2008 | Arai | F16K 31/04 |
| | | | | 251/129.11 |
| 8,302,624 | B2* | 11/2012 | Noh | F16K 37/0041 |
| | | | | 137/554 |
| 8,800,959 | B2* | 8/2014 | Hasunuma | F16K 31/04 |
| | | | | 137/554 |
| 8,851,448 | B2* | 10/2014 | Harada | F16K 31/04 |
| | | | | 251/129.11 |
| 9,366,353 | B2* | 6/2016 | Ooe | F16K 31/04 |
| 9,464,577 | B2* | 10/2016 | Galka | F16K 37/0033 |
| 9,525,373 | B2* | 12/2016 | Shimura | H02P 8/24 |
| 9,657,656 | B2* | 5/2017 | Weldon | F02D 31/003 |
| 10,234,056 | B2* | 3/2019 | Kawamura | F02D 13/02 |
| 2006/0261302 | A1* | 11/2006 | Inoue | F16K 1/04 |
| | | | | 251/129.11 |
| 2010/0289442 | A1* | 11/2010 | Hatano | H02K 29/08 |
| | | | | 318/400.38 |
| 2018/0299021 | A1* | 10/2018 | Narukawa | F25B 41/062 |

* cited by examiner

ELECTRICALLY OPERATED VALVE

TECHNICAL FIELD

The present invention relates to an electrically operated valve, and more particularly to an electrically operated valve which can detect a position of a valve body.

BACKGROUND ART

It has been known to employ an angle sensor for detecting a valve opening degree of an electrically operated valve.

As a relevant technique, a valve opening degree detecting device of an electrically operated valve is disclosed in patent document 1. The valve opening degree detecting device described in the patent document 1 is provided with a magnetic drum in which N poles and S poles fixed to a rotating shaft are circumferentially magnetized in a uniformly divided manner, a magnetic sensor for detecting an angle of rotation which is provided on a circumference outside a can facing the N and S poles, a magnet which is provided in an end portion of the rotating shaft, a magnetic sensor for detecting a vertical position which is provided outside the can facing the magnet, and a valve opening degree computing means which computes a valve opening degree on the basis of detected values of the magnetic sensor for detecting the angle of rotation and the magnetic sensor for detecting the vertical position.

Further, an electrically operated valve using a stepping motor is disclosed in patent document 2. The electrically operated valve described in the patent document 2 is provided with a stator, a rotor which is rotationally driven by the stator, a detection rotor which detects a rotational position of the rotor, and a Hall IC which is arranged outside the detection rotor. In the electrically operated valve described in the patent document 2, the rotational position of the rotor is detected on the basis of an output signal which is detected by the Hall IC arranged outside the detection rotor.

CITATION LIST

Patent Literature

PATENT LITERATURE 1: Japanese Unexamined Patent Application Publication No. 2001-12633
PATENT LITERATURE 2: Japanese Unexamined Patent Application Publication No. 2014-161152

SUMMARY OF THE INVENTION

Technical Problem

In the electrically operated valves described in the patent documents 1 and 2, the angle of rotation of the rotating body is detected by the magnetic sensor which is arranged in a radially outer direction of the rotating body such as the rotor. However, in the case that the angle of rotation of the rotating body is detected by the magnetic sensor which is arranged in the radially outer direction of the rotating body, it is difficult to precisely detect the angle of rotation of the rotating body if a lot of magnetic sensors are not arranged in the radially outer direction of the rotating body. In the case that a lot of magnetic sensors are arranged, a cost is increased. Further, it is necessary to secure a space for arranging a lot of magnetic sensors, and there is a risk that a support mechanism for supporting a lot of magnetic sensors is complicated. Further, in the case that the magnetic sensor detects the angle of rotation on the basis of increasing and decreasing of a Hall current, information of the angle of rotation is lost when an electric power supply is turned off, and there is a risk that an absolute angle of rotation of the rotating body is not known when the electric power supply is again turned on.

Accordingly, an object of the present invention is to provide an electrically operated valve which can more accurately detect a position of a valve body by accurately detecting an angle of rotation of a rotary shaft.

Solution to Problem

In order to achieve the object mentioned above, an electrically operated valve according to the present invention is provided with a valve shaft, a valve body which is arranged in a first end portion of the valve shaft, a rotor member which is rotatable around a rotor rotating shaft and is movable together with the valve shaft in a parallel direction to a first direction, a stator member which applies a turning force to the rotor member, a permanent magnet member which turns together with the rotor member, an angle sensor which is arranged above the permanent magnet included in the permanent magnet member and detects an angle of rotation of the permanent magnet, and a guide member which guides a relative movement of the rotor member or the valve shaft in relation to the permanent magnet member. The guide member is movable together with the rotor member in a parallel direction to the first direction and is rotatable together with the rotor member. Further, a distance between the permanent magnet and the angle sensor is fixed when the permanent magnet member turns.

The electrically operated valve mentioned above may be further provided with a case which accommodates the rotor member, and a first biasing member which biases the permanent magnet member in a direction toward an end wall of the case.

In the electrically operated valve mentioned above, the first biasing member may be arranged between the permanent magnet member and the rotor member, or between the permanent magnet member and the guide member.

In the electrically operated valve mentioned above, a bearing member may be arranged between the case and the permanent magnet member.

In the electrically operated valve mentioned above, the guide member may have a second engagement portion which engages with a first engagement portion provided in the permanent magnet member. Further, the second engagement portion may engage with the first engagement portion so as to be relatively non-rotatable and be relatively movable in the parallel direction to the first direction.

The electrically operated valve mentioned above may be further provided with a second biasing member which makes the valve shaft and the rotor member contact with each other.

The electrically operated valve mentioned above may be further provided with a lower base member, and a rotor support member which is directly or indirectly fixed to the lower base member. Further, a first thread portion of the rotor member and a second thread portion of the rotor support member may be threadably mounted each other.

The guide member mentioned above may be a second end portion of the valve shaft.

Effect of the Invention

According to the present invention, it is possible to provide the electrically operated valve which can more accurately detect a position of the valve body.

DESCRIPTION OF EMBODIMENTS

Figure 1:
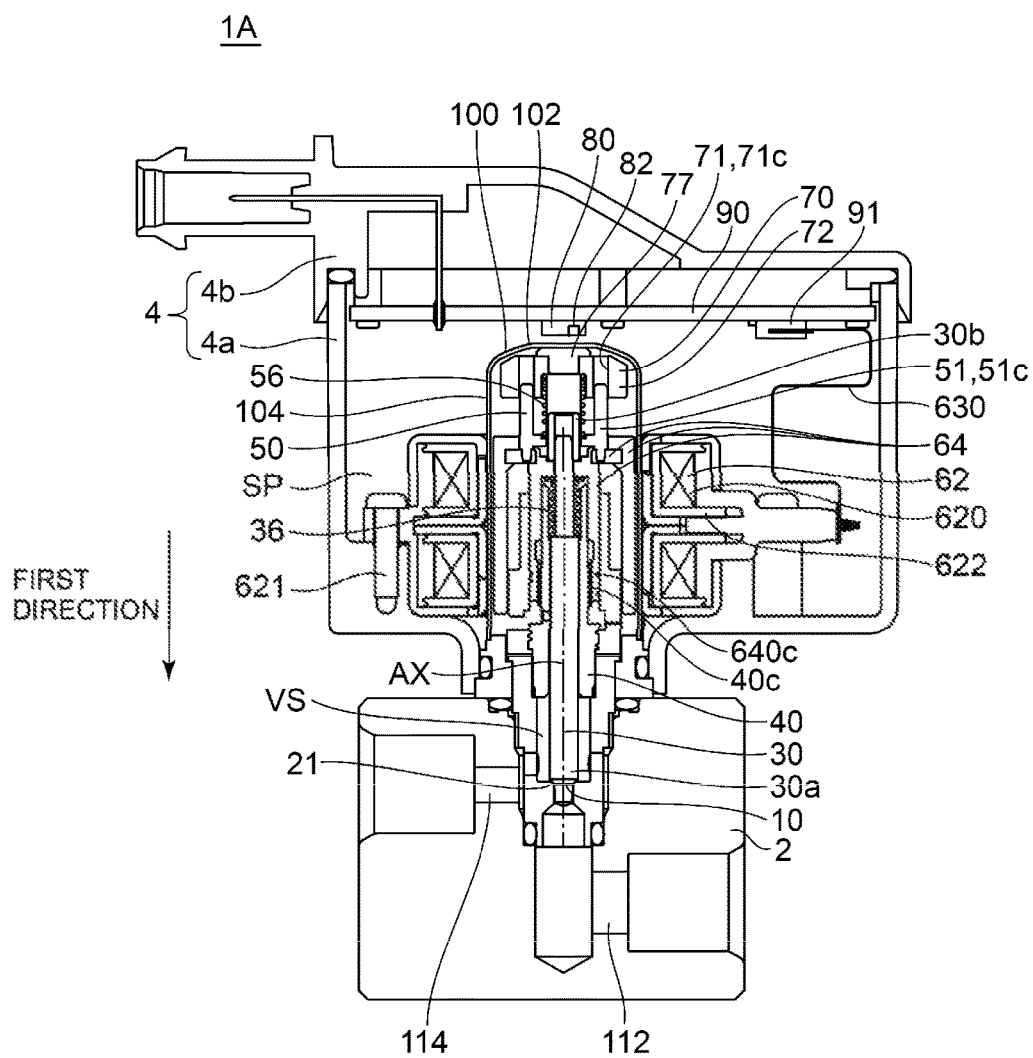
FIG. 1 is a schematically cross sectional view of an electrically operated valve according to a first embodiment.

A description will be given below of an electrically operated valve according to an embodiment with reference to the accompanying drawings. In the following description of the embodiment, the same reference numerals will be attached to positions and members having the same function, and a redundant description of the positions and the members having the same reference numerals will be omitted.

(Definition of Direction)

In the present specification, an end portion of a valve shaft 30 in a side of a valve body 10 is called as a first end portion 30a, and an end portion of the valve shaft 30 in an opposite side to the valve body is called as a second end portion 30b. Further, in the present specification, "upward direction" is defined as a direction from the first end portion toward the second end portion. Therefore, even in the case that the second end portion is actually below the first end portion, the direction from the first end portion toward the second end portion is "upward direction" in the present specification. In the present specification, an opposite direction to the upward direction, that is, a direction from the second end portion toward the first end portion is "downward direction".

First Embodiment

Figure 2:
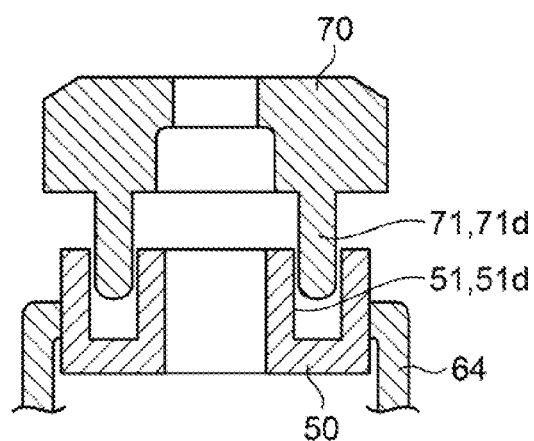
FIG. 2 is a schematically cross sectional view showing an example of an engagement relationship between a first engagement portion and a second engagement portion.
Figure 3A:
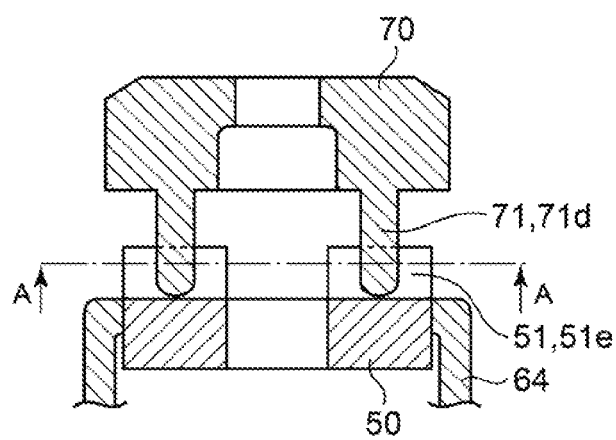
FIG. 3A is a schematically cross sectional view showing the other example of the engagement relationship between the first engagement portion and the second engagement portion.
Figure 3B:
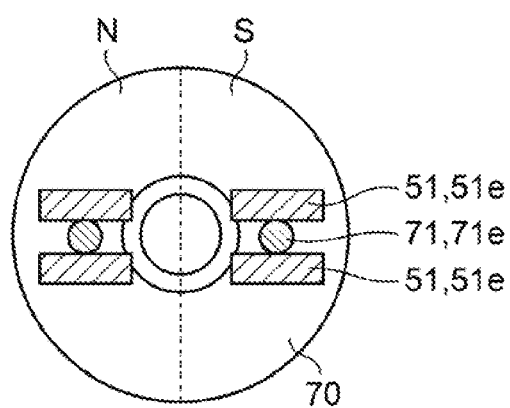
FIG. 3B is a cross sectional view as seen from an arrow A-A in FIG. 3A.
Figure 4:
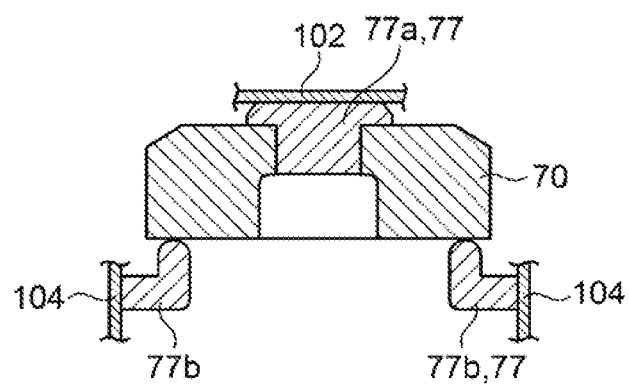
FIG. 4 is a schematically cross sectional view showing an example of a permanent magnet positioning mechanism.

A description will be given of an electrically operated valve 1A according to a first embodiment with reference to FIGS. 1 to 4. FIG. 1 is a schematically cross sectional view of the electrically operated valve 1A according to the first embodiment. FIG. 2 is a schematically cross sectional view showing an example of an engagement relationship between a first engagement portion 71 and a second engagement portion 51. FIG. 3A is a schematically cross sectional view showing the other example of the engagement relationship between the first engagement portion 71 and the second engagement portion 51. FIG. 3B is a cross sectional view as seen from an arrow A-A in FIG. 3A. FIG. 4 is a schematically cross sectional view showing an example of a permanent magnet positioning mechanism.

The electrically operated valve 1A is provided with a valve shaft 30, a valve body 10 which is arranged in a first end portion 30a of the valve shaft, a rotor member 64 which is rotatable around a rotor rotating shaft, a stator member 62 which applies a turning force to the rotor member 64, a permanent magnet member 70 which turns together with the rotor member 64, an angle sensor 80 which detects an angle of rotation of a permanent magnet 72 included in the permanent magnet member 70, and a guide member 50 which guides a relative movement of the rotor member 64 in relation to the permanent magnet member 70.

The valve shaft 30 is a member which supports the valve body 10. The valve shaft 30 has a rod-like shape.

The valve body 10 is arranged in a first end portion 30a, that is, a lower end portion of the valve shaft 30. The valve body 10 may be integrally formed in the valve shaft 30, or the valve body 10 and the valve shaft 30 may be separately provided and be connected to each other.

The valve body 10 closes a flow path by coming into contact with (seating on) a valve seat 21, and opens the flow path by moving away from the valve seat 21. In the example described in FIG. 1, the electrically operated valve 1A is provided with a first flow path 112, and a second flow path 114. When the valve body 10 and the valve seat 21 are away from each other, in other words, when the valve body 10 exists at an upward position, the fluid flows into a valve chamber VS via the first flow path 112, and the fluid within the valve chamber VS is discharged via the second flow path 114. On the other hand, when the valve body 10 seats on the valve seat 21, in other words, when the valve body 10 exists at a downward position, the first flow path 112 and the second flow path 114 are under a state in which they are not communicated with each other.

The rotor member 64 is rotatable around a rotor rotating shaft. In the example described in FIG. 1, the rotor rotating shaft coincides with a central axis AX of the valve shaft 30. The rotor member 64 is movable in a parallel direction to a first direction. The first direction is a direction which is parallel to the rotor rotating shaft, for example, "downward direction" or "upward direction".

The rotor member 64 is provided with a first thread portion 640c which is threadably mounted to a second thread portion 40c provided in the rotor support member 40. As a result, when the rotor member 64 turns around the rotor rotating shaft, the rotor member 64 vertically moves in the parallel direction to the first direction. Further, since the valve shaft 30 and the rotor member 64 are in contact with each other as mentioned later, the valve shaft 30 vertically moves in the parallel direction to the first direction when the rotor member 64 vertically moves in the parallel direction to the first direction.

The stator member 62 applies a turning force to the rotor member 64. More specifically, when an electric current flows in a coil 620 of the stator member 62, the rotor member 64 turns on the basis of an electromagnetic action between the coil 620 and the rotor member 64.

The permanent magnet member 70 includes the permanent magnet 72, and the permanent magnet 72 includes N poles and S poles in a cross section which is vertical to the rotor rotating shaft. Further, the permanent magnet member 70 turns around the rotor rotating shaft together with the rotor member 64. In addition, the permanent magnet member 70 relatively moves in the parallel direction to the first direction in relation to the rotor member 64. More specifically, the rotor member 64 vertically moves in relation to the permanent magnet member 70 in a state in which the permanent magnet member 70 is maintained its position in the upward and downward directions. A guide member 50 mentioned later guides the relative movement of the rotor member 64 in relation to the permanent magnet member 70.

The angle sensor 80 is arranged above the permanent magnet 72, and detects an angle of rotation (more specifically, an angle of rotation around the rotor rotating shaft) of the permanent magnet. The angle sensor 80 is arranged to be away from the rotating body including the permanent magnet 72 since the angle sensor 80 is a sensor for detecting the angle of rotation of the permanent magnet 72. The angle sensor 80 includes a magnetic detection element 82 which detects a magnetic flux density. When the permanent magnet 72 turns around the rotor rotating shaft, the magnetic flux passing through the magnetic detection element 82 changes. As mentioned above, the magnetic detection element 82 (the angle sensor 80) detects the angle of rotation of the permanent magnet 72.

When the permanent magnet 72 turns around the rotor rotating shaft, an angle of the magnetic flux passing through the magnetic detection element 82 arranged above the permanent magnet 72 continuously changes. As a result, the magnetic detection element 82 (the angle sensor 80) can continuously detect the angle of rotation of the permanent magnet 72. In the example described in FIG. 1, the change of the angle of rotation of the permanent magnet 72 is in proportion to a positional change in a direction along the central axis AX of the valve body 10. As a result, it is possible to calculate the position of the valve body 10 in the direction along the central axis AX, that is, an opening degree of the valve, on the basis of the detection of the angle of rotation of the permanent magnet 72 by the angle sensor 80. The electrically operated valve 1A may be provided with a computing device 91 which converts an angle data output by the angle sensor 80 into a position data of the valve body 10 in the direction along the central axis AX, that is, an opening degree data of the valve. The computing device may be arranged on the control board 90.

The guide member 50 is a member which guides the relative movement of the rotor member 64 in relation to the permanent magnet member 70. In the example described in FIG. 1, the guide member 50 is connected to the rotor member 64.

The guide member 50 moves in the parallel direction to the first direction together with the rotor member 64, and turns together with the rotor member 64. As a result, when the rotor member 64 vertically moves while turning around the rotor rotating shaft, the guide member 50 also moves vertically while turning around the rotor rotating shaft. On the contrary, the permanent magnet member 70 turns together with the guide member 50 and the rotor member 64, however, does not move in the upward and downward directions.

In order to guide the relative movement (the relative movement in the first direction) of the rotor member 64 in relation to the permanent magnet member 70, the guide member 50 and the permanent magnet member 70 include a slide mechanism in the example described in FIG. 1. In the example described in FIG. 1, the slide mechanism includes a first engagement portion 71 which is provided in the permanent magnet member 70, and a second engagement portion 51 which is provided in the guide member. Further, the first engagement portion 71 provided in the permanent magnet member 70 engages with the second engagement portion 51 provided in the guide member 50 so as to be relatively movable in the parallel direction to the first direction. The engagement between the first engagement portion 71 and the second engagement portion 51 is an engagement which is not relatively rotatable around the rotor rotating shaft.

In the example described in FIG. 1, the first engagement portion 71 is a hole portion 71c which is provided in the permanent magnet member 70, and the second engagement portion 51 is a convex portion 51c which can be inserted into the hole portion 71c. The hole portion 71c may be a hole portion in a penetrating mode, or may be a hole portion in a non-penetrating mode (that is, a concave portion).

Alternatively, the first engagement portion 71 provided in the permanent magnet member 70 may be a convex portion 71d, and the second engagement portion 51 provided in the guide member 50 may be a hole portion 51d, as shown in FIG. 2. Further alternatively, the first engagement portion 71 provided in the permanent magnet member 70 may be a convex portion 71e, and the second engagement portion 51 provided in the guide member 50 may be a convex portion 51e, as shown in FIGS. 3A and 3B.

In the first embodiment, a distance between the permanent magnet member 70 and the angle sensor 80 is fixed when the permanent magnet member 70 turns (more specifically, when the permanent magnet member 70 turns around the rotor rotating shaft).

In the first embodiment, the electrically operated valve 1A is provided with the guide member 50 which guides the relative movement of the rotor member 64 in relation to the permanent magnet member 70, and a distance between the permanent magnet member 70 and the angle sensor 80 is fixed when the permanent magnet member 70 turns. As a result, the change of the magnetic flux detected by the angle sensor 80 purely depends on the change of the angle of rotation of the permanent magnet member 70. In the case that the distance between the permanent magnet member 70 and the angle sensor 80 changes, it is necessary to evaluate a signal output from the angle sensor 80 while taking into consideration a change (noise) of the magnetic flux associated with the vertical movement of the permanent magnet member 70. On the contrary, in the first embodiment, the change (noise) of the magnetic flux associated with the vertical movement of the permanent magnet member 70 is not included in the signal output from the angle sensor 80 in principle. As a result, the computing device 91 can more accurately calculate the angle of rotation of the permanent magnet 72 on the basis of the signal which is output from the angle sensor 80. As a result, the computing device 91 can more accurately calculate the position of the valve body 10 in the upward and downward direction which is in proportion to the angle of rotation of the permanent magnet 72.

In the example described in FIG. 1, the electrically operated valve 1A is provided with a case (for example, a can 100) which accommodates the rotor member 64, and a first biasing member 56 (for example, a spring such as a compression spring) which biases the permanent magnet member 70 in a direction toward an end wall 102 of the case. As a result, the permanent magnet member 70 is pressed toward the end wall 102 of the case via a bearing member 77, and the distance between the permanent magnet member 70 and the angle sensor 80 does not change. In the example described in FIG. 1, the end wall 102, the bearing member 77 and the first biasing member 56 may be called as a permanent magnet positioning member which maintains the distance between the permanent magnet 72 and the angle sensor 80.

Alternatively, the permanent magnet member 70 may be supported by an upper bearing 77a and a lower bearing 77b so as to be immobile in the upward and downward direction and be rotatable around the rotor rotating shaft, as shown in FIG. 4. In this case, the bearing member 77 (the upper bearing 77a and the lower bearing 77b) may be the permanent magnet positioning member which maintains the distance between the permanent magnet 72 and the angle sensor 80. In the example described in FIG. 4, the upper bearing 77a is arranged between the permanent magnet member 70 and the end wall 102 of the case, and the lower bearing 71b is arranged between a side wall 104 of the case (the can 100) and a lower surface of the permanent magnet member 70.

In the first embodiment, in the case that the electrically operated valve 1A is provided with the first biasing member 56 which biases the permanent magnet member 70 in the direction toward the end wall 102 of the case, it is possible to maintain the distance between the permanent magnet member 70 and the angle sensor 80 on the basis of a simple mechanism.

Further, in the first embodiment, in the case that the bearing member 77 is arranged between the case and the permanent magnet member 70, the permanent magnet member 70 smoothly turns in relation to the case.

(Motion of Electrically Operated Valve 1A)

Subsequently, a description will be given of an example of a motion of the electrically operated valve 1A with reference to FIG. 1. In an initial state, it is assumed that the valve body 10 and the valve seat 21 are away from each other (more specifically, the position of the valve body 10 is assumed to be above the position shown in FIG. 1). In a first step ST1, an electric current flows in a coil 620 of the stator member 62.

When the electric current flows in the coil 620, the rotor member 64 turns on the basis of an electromagnetic action between the coil 620 and the rotor member 64 (a second step ST2). As mentioned above, the rotor member 64 vertically moves as well as turning. As a result, in the second step ST2, the rotor member 64 vertically moves as well as turning (here, it is assumed that the rotor member 64 moves in a downward direction).

The guide member 50 is connected to the rotor member 64. As a result, when the rotor member 64 moves in the downward direction as well as turning, the guide member 50 moves in the downward direction as well as turning (a third step ST3). Further, the rotor member 64 and the valve shaft 30 are brought into pressure contact with each other, as mentioned later. As a result, when the rotor member 64 moves in the downward direction as well as turning, the valve shaft 30 moves in the downward direction. As mentioned above, the valve body 10 seats on the valve seat 21 (a fourth step ST4).

The guide member 50 and the permanent magnet member 70 are engaged so as to be relatively non-rotatable around the rotor rotating shaft, and are engaged so as to be relatively movable in the first direction. As a result, when the guide member 50 moves in the downward direction as well as turning in the third step ST3, the permanent magnet member 70 turns around the rotor rotating shaft. Further, the angle of rotation of the permanent magnet 72 included in the permanent magnet member 70 is detected by the angle sensor.

In the third step ST3, an amount of rotation of the rotor member 64 is in proportion to an amount of movement of the valve shaft 30 in the upward and downward direction, and an amount of rotation of the rotor member 64 is in proportion to an angle of rotation (an amount of rotation) of the permanent magnet detected by the angle sensor. As a result, in the first embodiment, it is possible to determine the positions of the valve shaft 30 and the valve body 10 in the upward and downward direction on the basis of the angle of rotation (the angle of rotation) of the permanent magnet detected by the angle sensor 80.

More Detailed Description of First Embodiment

Figure 5:
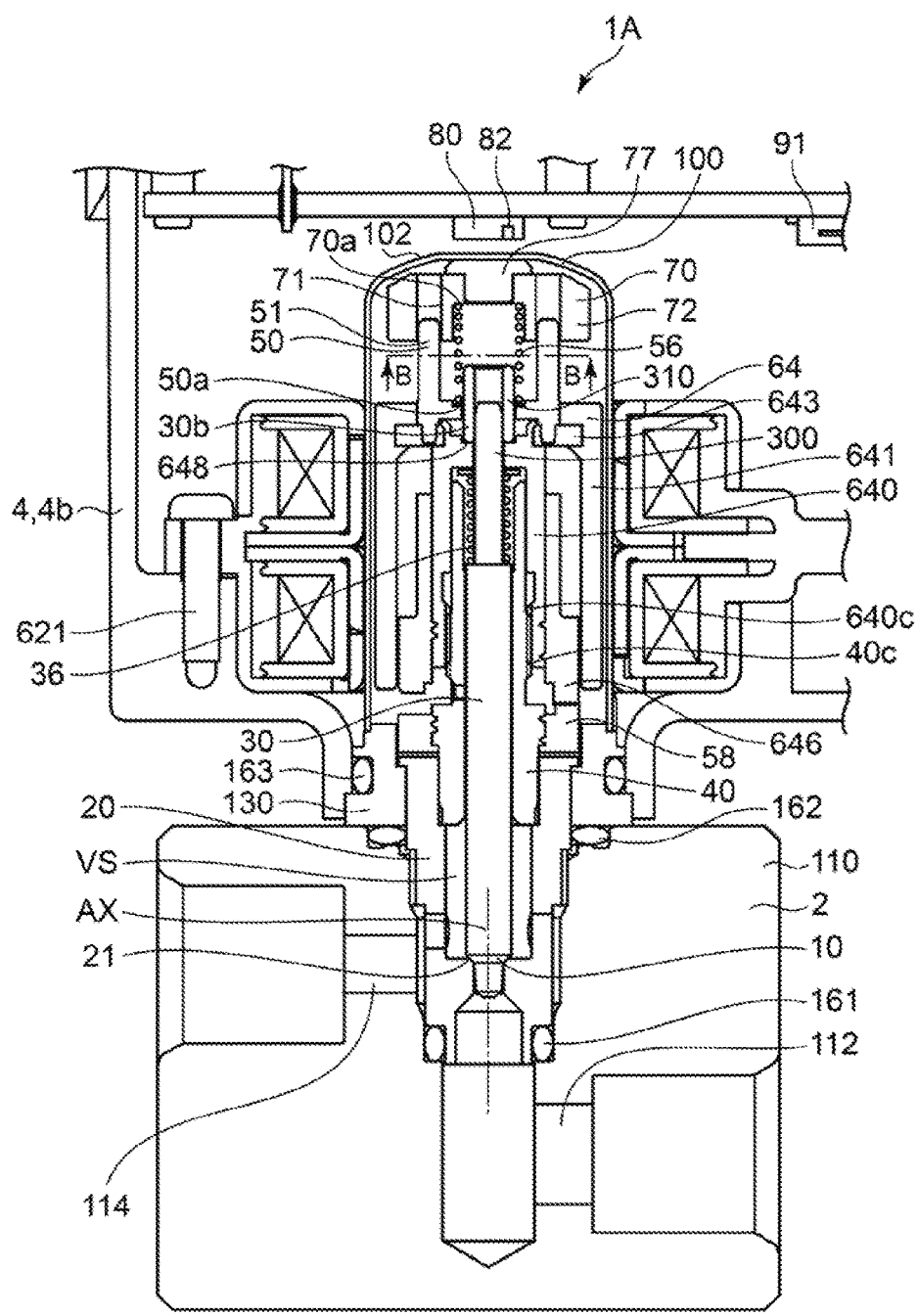
FIG. 5 is a schematically enlarged cross sectional view of a part of the electrically operated valve according to the first embodiment.
Figure 6:
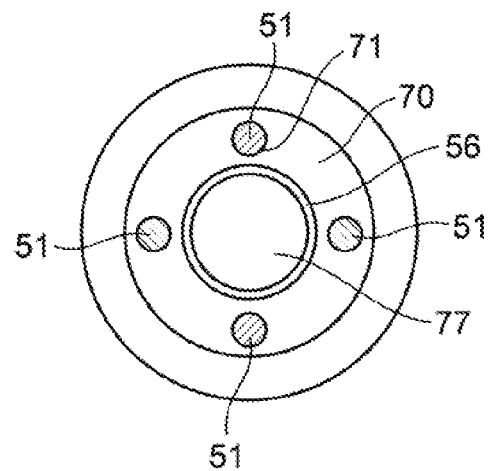
FIG. 6 is a cross sectional view as seen from an arrow B-B in FIG. 5.
Figure 7:
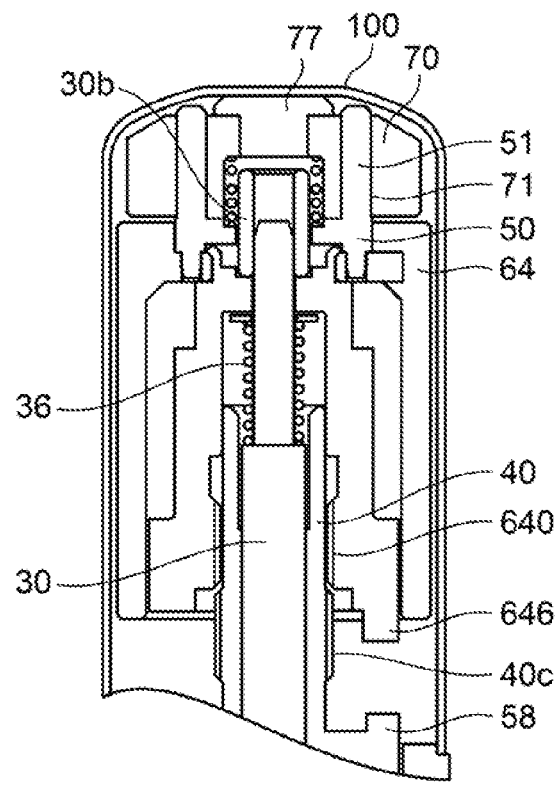
FIG. 7 is a schematically enlarged cross sectional view of a part of the electrically operated valve according to the first embodiment.

A description will be given in more detail of each of constituent elements of the first embodiment with reference to FIG. 1 and FIGS. 5 to 7. FIG. 5 is a schematically enlarged cross sectional view of a part of the electrically operated valve 1A according to the first embodiment. FIG. 6 is a cross sectional view as seen from an arrow B-B in FIG. 5. FIG. 7 is a schematically enlarged cross sectional view of a part of the electrically operated valve 1A according to the first embodiment. FIG. 7 shows a state in which the valve shaft 30 is in an upward position.

(Housing Member 4)

In the example described in FIG. 1, the electrically operated valve 1A is provided with a housing member 4. An accommodation space SP (for example, a liquid-tight closed space) is formed within the housing member 4, and the stator member 62, the can 100 and a control board 90 are accommodated in the accommodation space SP.

In the example described in FIG. 1, the housing member 4 is provided with a tubular member 4a which constructs a side wall, and a cover member 4b.

(Case Accommodating Rotor Member 64 and Permanent Magnet Member 70)

In the example described in FIG. 1, the electrically operated valve 1A is provided with a case (for example, the can 100 made of metal) which accommodates the rotor member 64 and the permanent magnet member 70. Further, an end wall 102 of the case is arranged between the angle sensor 80 and the permanent magnet member 70. In other words, the angle sensor 80 and the permanent magnet member 70 are arranged so as to face to each other via the end wall 102 of the case. The case does not turn. Therefore, the rotor member 64 and the permanent magnet member 70 relatively turn in relation to the case which is in a stationary state, when the electrically operated valve 1A is activated. When the rotating body such as the rotor member 64 and the permanent magnet member 70 turns within the case, an oscillation of the rotating body may be transmitted to the case. In the example described in FIG. 1, the transmission of the oscillation of the rotating body to the angle sensor 80 is suppressed since the angle sensor 80 is arranged to be away from the case. As a result, a precision for detecting the angle of the permanent magnet 72 by the angle sensor 80 is improved.

In the example described in FIG. 1, the end wall 102 of the case covers an upper surface of the permanent magnet member 70. Further, in the example described in FIG. 1, the end wall 102 has a dome shape which is convex to its upper side. Further, a cylindrical side wall 104 extends downward from the end wall 102 of the case.

(Stator Member 62)

The stator member 62 includes a bobbin 622 and the coil 620 which is wound to the bobbin. A pulse signal is input to the coil 620 from an electric wire 630 which is connected to an electric power supply. Further, when the pulse signal is input to the coil 620, the rotor member 64 turns at the angle of rotation which corresponds to the pulse number of the pulse signal. More specifically, a stepping motor is constructed by the stator member 62 and the rotor member 64 in the example described in FIG. 1.

In the example described in FIG. 1, the stator member 62 is firmly fixed to the side wall 104 of the can 100. In addition, the stator member 62 is fixed to the housing member 4 via a bolt 621.

(Control Board 90)

The control board 90 (more specifically, a circuit on the control board) controls the pulse number which is supplied to the coil 620. When a predetermined pulse number is supplied to the coil 620, the rotor member 64 turns at the angle of rotation which corresponds to the pulse number.

In the example described in FIG. 1, the angle sensor 80 is supported to the control board 90 which control the turning motion of the rotor member 64. As a result, it is not necessary to specially prepare a support member for supporting the angle sensor 80. As a result, the structure of the electrically operated valve 1A is simplified, and it is possible to downsize the electrically operated valve 1A. In the example described in FIG. 1, the control board 90 is supported by the housing member 4 (more specifically, the cover member 4*b*).

(Rotor Member 64)

The rotor member 64 is arranged in an inner side of the side wall 104 of the can 100 so as to be rotatable in relation to the can 100. The rotor member 64 is formed by a magnetic material. The rotor member 64 is provided with a magnet, however, the magnet is a different magnet from the permanent magnet 72 which is detected its angle of rotation by the angle sensor 80.

A description will be in detail given of the rotor member 64 with reference to FIG. 5. The rotor member 64 has an outer tube 641 which includes a magnet, and an inner tube 640 which includes a first thread portion 640*c*. The magnet included in the outer tube 641 is constructed, for example, by a plastic magnet.

A material of the inner tube 640 is, for example, a metal. The first thread portion 640*c* of the inner tube 640 is a female thread portion. The first thread portion 640*c* is threadably mounted to a second thread portion 40*c* (a male thread portion) of the rotor support member 40.

In the example described in FIG. 5, the rotor member 64 includes a connection member 643. Further, an upper end portion of the outer tube 641 and an upper end portion of the inner tube 640 are connected via the connection member 643. The connection member 643 has, for example, a ring shape. A material of the connection member 643 is, for example, a metal such as brass. The connection member 643 and the outer tube 641 (the plastic magnet) may be integrally formed according to an insert molding. The connection member 643 and the inner tube 640 may be firmly fixed according to a caulking process.

In the example described in FIG. 5, the rotor member 64 includes a positioning member 646. The positioning member 646 defines a lower limit position of the movement of the rotor member 64. Specifically, when the rotor member 64 moves in the downward direction while turning, the positioning member 646 and a stopper 58 are in contact with each other. The position where the positioning member 646 and the stopper 58 are in contact with each other is the lower limit position of the movement of the rotor member 64.

The stopper 58 may be provided in any given member which does not turn together with the rotor member 64. In the example described in FIG. 5, the stopper 58 is provided in the rotor support member 40 (for example, firmly fixed to the rotor support member 40). Alternatively, the stopper 58 may be provided in the case (the can 100).

When the rotor member 64 moves in the downward direction while turning, the angle sensor 80 detects the rotation of the permanent magnet 72 in one direction (for example, the rotation in a clockwise direction). On the contrary, when the positioning member 646 comes into contact with the stopper 58, the rotor member 64 thereafter carries out a rotational reciprocating motion for a while. At this time, the angle sensor 80 detects the rotational reciprocating motion of the permanent magnet 72 (for example, a motion that the permanent magnet 72 alternately repeats the rotation in the clockwise direction and the rotation in a counterclockwise direction). As mentioned above, the computing device 91 can determine on the basis of the output signal from the angle sensor 80 whether or not the positioning member 64 comes into contact with the stopper 58. Before the positioning member 646 comes into contact with the stopper 58, the valve body 10 seats on the valve seat 21 and the second biasing member 36 contracts. As a result, the valve body 10 is not away from the valve seat 21 under the rotational reciprocating motion of the rotor member 64.

As mentioned above, in the first embodiment, it is possible to detect the seating of the valve body 10 on the valve seat 21 on the basis of the output signal from the angle sensor 80 (the output signal corresponding to the angle of rotation of the permanent magnet 72).

(Rotor Support Member 40)

The rotor support member 40 supports the rotor member 64, and guides a helical motion (a vertically moving motion while turning) of the rotor member 64. More specifically, the helical motion of the rotor member 64 is defined by the threadable mounting between the second thread portion 40*c* of the rotor support member 40, and the first thread portion 640*c* of the rotor member 64.

The rotor support member 40 is directly or indirectly fixed to the lower base member 2. In the example described in FIG. 5, the rotor support member 40 is fixed to the lower base member 2 (more specifically, the valve main body 20 constructing a part of the lower base member 2).

(Guide Member 50)

A description will be given of the guide member 50 with reference to FIG. 5. The guide member 50 is connected to the rotor member 64. The connection between the guide member 50 and the rotor member 64 may be achieved by the connection according to firm fixing or may be achieved by the connection according to fitting. In the example described in FIG. 5, the convex portion of the guide member 50 is fitted to the hole portion of the rotor member 64 (more specifically, the connection member 643), and the guide member 50 is pressed against the rotor member 64 by the first biasing member 56. As a result, the guide member 50 and the rotor member 64 integrally turn around the rotor rotating shaft, and integrally move vertically.

In the example described in FIG. 6, the guide member 50 is provided with four second engagement portions 51. Further, four second engagement portions 51 of the guide member 50 respectively engage four first engagement portions 71 which are provided in the permanent magnet member 70. However, the number of the second engagement portions 51 (and the number of the first engagement portions 71) may be set to one, two, three or five or more. The material of the guide member 50 is, for example, metal.

(First Biasing Member 56)

In the example described in FIG. 5, the electrically operated valve 1A is provided with a first biasing member 56 (for example, a compression spring) which biases the permanent magnet member 70 in a direction toward the end wall 102 of the case. A distance between the permanent magnet member 70 and the angle sensor 80 is maintained constant on the basis of the biasing force of the first biasing member 56.

In the example described in FIG. 5, the first biasing member 56 is arranged between the guide member 50 and the permanent magnet member 70. More specifically, a first receiving portion 50a (for example, a concave portion) supporting one end portion of the first biasing member 56 is provided in an upper surface of the guide member 50, and a second receiving portion 70a (for example, a concave portion) supporting the other end portion of the first biasing member 56 is provided in a lower surface of the permanent magnet member 70.

In the example described in FIG. 5, the first biasing member 56 is arranged between the guide member 50 and the permanent magnet member 70, however, the first biasing member 56 may be arranged between the permanent magnet member 70 and the rotor member 64.

(Permanent Magnet Member 70)

The permanent magnet member 70 includes a permanent magnet 72, and the permanent magnet 72 includes N poles and S poles in a cross section which is vertical to the rotor rotating shaft. The number of the N poles and the number of the S poles in the cross section which is vertical to the rotor rotating shaft may be respectively set to one in the same manner as the example described in FIG. 3B. Alternatively, the number of the N poles and the number of the S poles in the cross section which is vertical to the rotor rotating shaft may be respectively set to be equal to or more than two. The permanent magnet 72 is constructed, for example, by a plastic magnet.

In the example described in FIG. 5, the bearing member 77 is arranged between the permanent magnet member 70 and the end wall 102 of the case. The bearing member 77 may be constructed, for example, by a low-friction material such as polytetrafluoroethylene (PTFE), or may be constructed by a member which can roll such as a ball bearing.

(Valve Shaft 30)

The valve shaft 30 is a rod-like member which supports the valve body 10. The valve body 10 is arranged in a first end portion 30a of the valve shaft 30, and a second end portion 30b of the valve shaft 30 is supported by the rotor member 64. In the example described in FIG. 5, a lower surface of the second end portion 30b of the valve shaft 30 is supported by an upper surface of the rotor member 64 (more specifically, an upper surface of the inner tube 640).

In the example described in FIG. 5, the valve shaft 30 is provided with a valve shaft main body 300, and a contact member 310 (a member coming into contact with the rotor member 64, also called as a push nut) which is connected to an upper end portion of the valve shaft main body 300. The valve shaft main body 300 and the contact member 310 may be connected by pressing the valve shaft main body 300 into the contact member 310, or may be connected according to the other methods. Alternatively, the valve shaft main body 300 and the contact member 310 may be one integrally formed member. In the example described in FIG. 5, the second end portion 30b is constructed by the contact member 310.

The second end portion 30b (the contact member 310) of the valve shaft 30 is supported by a valve shaft support portion 648 (for example, a concave portion) of the rotor member 64. The valve shaft 30 is biased downward by the second biasing member 36. As a result, in a state in which the valve body 10 is away from the valve seat 21, the second end portion 30b (the contact member 310) of the valve shaft 30 is in contact with the valve shaft support portion 648 of the rotor member 64. Accordingly, the valve shaft 30 vertically moves together with the rotor member 64. Further, the second end portion 30b of the valve shaft 30 and the valve shaft support portion 648 are brought into pressure contact with each other by the biasing force applied by the second biasing member 36. As a result, the valve shaft 30 turns together with the rotor member 64 in a state in which the valve body 10 is away from the valve seat 21.

When the rotor member 64 moves further downward while turning after the valve body 10 comes into contact with the valve seat 21, the second biasing member 36 contracts, and the valve body 10 is pressed against the valve seat 21. Further, the valve shaft 30 (and the valve body 19) stops rotation around the central axis AX on the basis of the friction force between the valve body 10 and the valve seat 21. Therefore, after the valve body 10 comes into contact with the valve seat 21, the rotor member 64 turns around the rotor rotating shaft in a state in which the rotation of the valve shaft 30 stops.

In the example described in FIG. 5, the movement (the vertical movement and the turning movement around the central axis AX) of the valve shaft 30 is guided by an inner peripheral surface of the rotor support member 40. In other words, a gap between an outer peripheral surface of the valve shaft 30 and the inner peripheral surface of the rotor support member 40 is a small gap. Further, in the example described in FIG. 5, the thread portion threadably mounting to the other member is not provided in the outer surface of the valve shaft 30.

(Second Biasing Member 36)

In the example described in FIG. 5, the second biasing member 36 is arranged between the rotor member 64 and the valve shaft 39 (more specifically, a step portion of the valve shaft 39). Alternatively, the second biasing member 36 may be arranged between the guide member 50 and the valve shaft 30.

The second biasing member 36 has a function of biasing the valve shaft 30 downward and pressing the valve body 10 against the valve seat 21 when the valve body 10 seats on the valve seat 21. In addition, the second biasing member 36 has a function of biasing the rotor member 64 upward, bringing the rotor member 64 and the valve shaft 30 into pressure contact with each other and making the movement of the valve shaft 30 follow the movement of the rotor member 64.

(Lower Base Member 2)

In the example described in FIG. 5, the lower base member 2 is provided with a base main body 110 which includes a first flow path 112 and a second flow path 114, a valve main body 20 which is installed to the base main body 110, and a case support member 130 (a can support member) which is installed to the valve main body 20.

The valve main body 20 has a valve seat 21, and defines a valve chamber VS. In the example described in FIG. 5, the valve main body 20 is threadably mounted and connected to the base main body 110. Further, a first seal member 161 (an O-ring) is arranged between the valve main body 20 and the base main body 110.

The case support member 130 supports the case (the can 100). The case support member 130 and the case (the can 100) are firmly fixed to each other. In the example described in FIG. 5, the case support member 130 is pinched between a flange portion of the valve main body 20 and the vase main body 110. Further, a second seal member 162 (an O-ring) is arranged within a space which is defined by the case support member 130, the valve main body 20 and the base main body 110. Further, the housing member 4 mentioned above is connected to the case support member 130, and a third seal member 163 (an O-ring) is arranged between the housing member 4 and the case support member 130.

Second Embodiment

Figure 8:
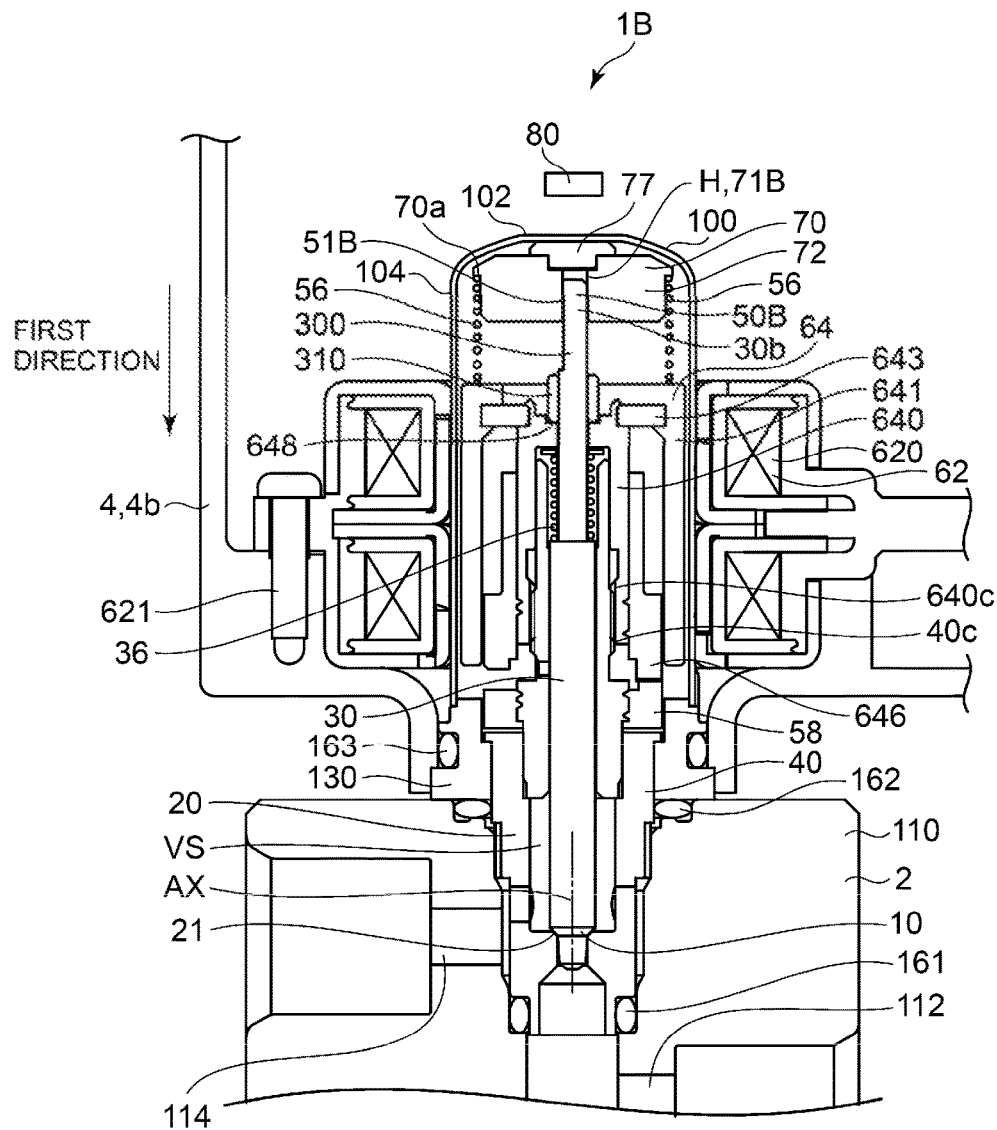
FIG. 8 is a schematically enlarged cross sectional view of a part of an electrically operated valve according to a second embodiment.
Figure 9:
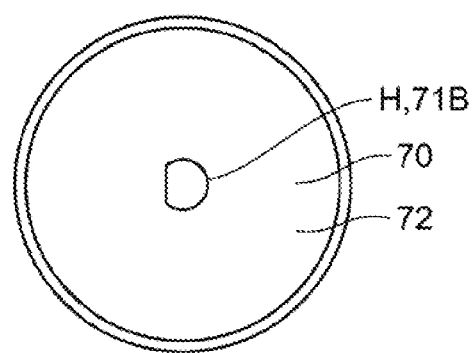
FIG. 9 is a bottom elevational view of a permanent magnet member.

A description will be given of an electrically operated valve 1B according to a second embodiment with reference to FIGS. 8 and 9. FIG. 8 is a schematically enlarged cross sectional view of a part of the electrically operated valve 1B according to the second embodiment. FIG. 9 is a bottom elevational view of a permanent magnet member 70.

The electrically operated valve 1B in the second embodiment is different in a structure of a guide member 50B from the structure of the guide member 50 according to the first embodiment. The electrically operated valve 1B according to the second embodiment is the same as the electrically operated valve 1A according to the first embodiment in the other points. In the second embodiment, a description will be given mainly of the structure of the guide member 50B, and a redundant description of the other structures will be omitted.

In the second embodiment, the guide member 50B is the second end portion 30b of the valve shaft 30. In the example described in FIG. 8, the valve shaft 30 and the guide member 50B are integrally formed, however, the valve shaft 30 and the guide member 50B may be separately prepared and be connected to each other.

The guide member 50B guides the relative movement of the valve shaft 30 in relation to the permanent magnet member 70. More specifically, the guide member 50B engages with the permanent magnet member 70 so as to be relatively non-rotatable and be relatively movable in the parallel direction to the first direction. Further, the relative movement of the valve shaft 30 in relation to the permanent magnet 70 is guided on the basis of a sliding movement between the guide member 50B and the permanent magnet member 70.

In the example described in FIG. 8, the valve shaft 30 and the rotor member 64 are brought into pressure contact with each other as mentioned later. As a result, the guide member 50B and the valve shaft 30 are movable in the parallel direction to the first direction together with the rotor member 64, and are rotatable around the rotor rotating shaft together with the rotor member 64.

A description will be given in further detail of the guide member 50B.

The guide member 50B is inserted into a hole H provided in the permanent magnet member 70 (the hole H may be constructed by a through hole, or may be constructed by a non-through hole). In the example described in FIGS. 8 and 9, a cross sectional shape of a wall surface defining the hole H which is vertical to the rotor rotating shaft is a non-circular shape such as a D-shaped form. Further, a cross sectional shape of the guide member 50B (the second end portion 30b) which is vertical to the rotor rotating shaft is a non-circular shape such as a D-shaped form. As a result, the guide member 50B and the permanent magnet member 70 are relatively movable in the parallel direction to the first direction and are relatively non-rotatable around the rotor rotating shaft.

In the example described in FIG. 8, an outer peripheral surface of the guide member 50B corresponds to a second engagement portion 51B, and the wall surface defining the hole H of the permanent magnet member 70 corresponds to a first engagement portion 71B. Further, the second engagement portion 51B engages with the first engagement portion 71B so as to be relatively non-rotatable and be relatively movable in the parallel direction to the first direction.

In the example described in FIG. 8, the electrically operated valve 1B is provided with a case (for example, the can 100) which accommodates the rotor member 64, and a first biasing member 56 (for example, the spring such as the compression spring) which biases the permanent magnet member 70 in a direction toward the end wall 102 of the case. As a result, the permanent magnet 70 is pressed against the end wall 102 of the case via the bearing member 77, and a distance between the permanent magnet member 70 and the angle sensor 80 does not change.

In the example described in FIG. 8, the first biasing member 56 is arranged between the rotor member 64 and the permanent magnet member 70. More specifically, one end portion of the first biasing member 56 is supported by the upper surface (the first receiving portion) of the rotor member 64, and the other end portion of the first biasing member 56 is supported by the second receiving portion 70a of the permanent magnet member 70.

In the example described in FIG. 8, the valve shaft 30 is provided with the valve shaft main body 300, and the contact member 310 (the member coming into contact with the rotor member 64) which is connected to the valve shaft main body 300. The valve shaft main body 300 and the contact member 310 may be connected by pressing the valve shaft main body 300 into the contact member 310, or may be connected according to the other methods. Alternatively, the valve shaft main body 300 and the contact member 310 may be constructed by one integrally formed member.

The contact member 310 is supported by the valve shaft support portion 648 (for example, the concave portion) of the rotor member 64. The valve shaft 30 is biased downward by the second biasing member 36. As a result, the contact member 310 of the valve shaft 30 is in contact with the valve shaft support portion 648 of the rotor member 64, in a state in which the valve body 10 is away from the valve seat 21. Therefore, the valve shaft 30 vertically moves together with the rotor member 64. Further, the contact member 310 of the valve shaft 30 and the valve shaft support portion 648 are brought into pressure contact with each other on the basis of the biasing force applied by the second biasing member 36. As a result, the valve shaft 30 turns together with the rotor member 64 in a state in which the valve body 10 is away from the valve seat 21.

When the rotor member 64 moves further downward while turning after the valve body 10 comes into contact with the valve seat 21, the second biasing member 36 contracts, and the valve body 10 is pressed against the valve seat 21. Further, the valve shaft 30 (and the valve body 10) stops rotation around the central axis AX on the basis of the friction force between the valve body 10 and the valve seat 21. As a result, after the valve body 10 comes into contact with the valve seat 21, the rotor member 64 turns around the rotor rotating shaft in a state in which the rotation of the valve shaft 30 stops.

The second embodiment achieves the same effects as those of the first embodiment. In addition, in the second embodiment, the valve shaft 30 doubles as the guide member 50B. As a result, it is not necessary to a dedicated guide member, and the number of the parts is reduced. Further, the guide mechanism is simplified.

Further, in the second embodiment, when the valve body 10 seats on the valve seat 21, the rotation of the valve shaft 30 around the rotor central axis stops. Further, the rotation of the permanent magnet member 70 turning together with the valve shaft 30 stops. More specifically, in the second embodiment, the angle of rotation of the permanent magnet member 70 (the permanent magnet 72) does not change after the valve body 10 seats on the valve seat 21. As mentioned above, in the second embodiment, the computing device determines that the valve body 10 seats on the valve seat 21 in the case that the output signal from the angle sensor 80 becomes constant, in other words, in the case that the rotation of the permanent magnet 72 stops. As a result, in the second embodiment, it is possible to accurately and simply detect the seating of the valve body 10 on the valve seat 21. Further, it is possible to accurately determine the opening degree of the electrically operated valve 1B by utilizing the angle of rotation of the permanent magnet 72 when the valve body 10 seats on the valve seat 21 as a reference (a reference angle of rotation), and calculating the change of the angle of rotation of the permanent magnet 72 from the reference angle of rotation. In other words, it is possible to compensate a zero point of the opening degree of the electrically operated valve 1B, every time that the valve body 10 seats on the valve seat 21.

The present invention is not limited to the embodiments mentioned above. It is possible to freely combine the embodiments mentioned above, or modify any given constituent elements of each of the embodiments or omit any given constituent elements in each of the embodiments, within the scope of the present invention.

REFERENCE SIGNS LIST

1A: electrically operated valve
1B: electrically operated valve
2: lower base member
4: housing member
4a: tubular member
4b: cover member
10: valve body
20: valve main body
21: valve seat
30: valve shaft
30a: first end portion
30b: second end portion
36: second biasing member
40: rotor support member
40c: second thread portion
50: guide member
50B: guide member
50a: first receiving portion
51: second engagement portion
51B: second engagement portion
51c: convex portion
51d: hole portion
51e: convex portion
56: first biasing member
58: stopper
62: stator member
64: rotor member
70: permanent magnet member
70a: second receiving portion
71: first engagement portion
71B: first engagement portion
71c: hole portion
71d: convex portion
71e: convex portion
72: permanent magnet
77: bearing member
77a: upper bearing
77b: lower bearing
80: angle sensor
82: magnetic detection element
90: control board
91: computing device
100: can
102: end wall
104: side wall
110: base main body
112: first flow path
114: second flow path
130: case support member
161: first seal member
162: second seal member
163: third seal member
300: valve shaft main body
310: contact member
620: coil
621: bolt
622: bobbin
630: electric wire
640: inner tube
640c: first thread portion
641: outer tube
643: connection member
646: positioning member
648: valve shaft support portion
AX: central axis
H: hole
SP: accommodation space
VS: valve chamber

The invention claimed is:

1. An electrically operated valve comprising:
a valve shaft;
a valve body which is arranged in a first end portion of the valve shaft;
a rotor member which is rotatable around a rotor rotating shaft and is movable together with the valve shaft in a parallel direction to a first direction;
a stator member which applies a turning force to the rotor member;
a permanent magnet member which turns together with the rotor member;
an angle sensor which is arranged above a permanent magnet included in the permanent magnet member and detects an angle of rotation of the permanent magnet; and
a guide member which guides a relative movement of the rotor member or the valve shaft in relation to the permanent magnet member,
wherein the guide member is movable together with the rotor member in a parallel direction to the first direction and is rotatable together with the rotor member, and
wherein a distance between the permanent magnet and the angle sensor is fixed when the permanent magnet member turns.

2. The electrically operated valve according to claim 1, further comprising:
a case which accommodates the rotor member; and
a first biasing member which biases the permanent magnet member in a direction toward an end wall of the case.

3. The electrically operated valve according to claim 2, wherein the first biasing member is arranged between the permanent magnet member and the rotor member, or between the permanent magnet member and the guide member.

4. The electrically operated valve according to claim 2, wherein a bearing member is arranged between the case and the permanent magnet member.

5. The electrically operated valve according to claim 1, wherein the guide member has a second engagement portion which engages with a first engagement portion provided in the permanent magnet member, and wherein the second engagement portion engages with the first engagement portion so as to be relatively non-rotatable and be relatively movable in the parallel direction to the first direction.

6. The electrically operated valve according to claim 1, further comprising a second biasing member which makes the valve shaft and the rotor member contact with each other.

7. The electrically operated valve according to claim 1, further comprising:

a lower base member; and a rotor support member which is directly or indirectly fixed to the lower base member, wherein a first thread portion of the rotor member and a second thread portion of the rotor support member are threadably mounted each other.

8. The electrically operated valve according to claim 1, wherein the guide member is a second end portion of the valve shaft.

\* \* \* \* \*